United States Patent
Smallwood

(10) Patent No.: US 6,687,910 B1
(45) Date of Patent: Feb. 10, 2004

(54) SMOKE SIMULATING SHIELD COVERING SCBA FACEPLATE

(76) Inventor: Ronald F. Smallwood, 780 S. Goldfinch Way, Anaheim, CA (US) 92807

( * ) Notice: Subject to any disclaimer, the term of this patent is extended or adjusted under 35 U.S.C. 154(b) by 0 days.

(21) Appl. No.: 10/243,452

(22) Filed: Sep. 13, 2002

(51) Int. Cl.⁷ .............................. A61F 9/00; G09B 19/00
(52) U.S. Cl. ....................... 2/15; 2/5; 2/9; 2/10; 2/434; 434/226; 434/36
(58) Field of Search .............................. 2/15, 13, 434, 2/438, 435, 424, 9, 10, 5, 6, 4; 434/36, 226

(56) References Cited

U.S. PATENT DOCUMENTS

| | | | | |
|---|---|---|---|---|
| 2,393,955 A | * | 2/1946 | Baratelli et al. | ................. 2/13 |
| 3,254,932 A | * | 6/1966 | Blaney | ......................... 351/47 |
| 3,945,044 A | * | 3/1976 | McGee et al. | ................. 2/436 |
| 4,057,057 A | | 11/1977 | Backlund | |
| 4,069,516 A | | 1/1978 | Watkins, Jr. | |
| 4,076,373 A | * | 2/1978 | Moretti | ....................... 359/507 |
| 4,716,601 A | * | 1/1988 | McNeal | .......................... 2/434 |
| 5,069,205 A | | 12/1991 | Urso | |
| 5,080,092 A | | 1/1992 | Tenna | |
| H1023 H | * | 3/1992 | Wiseman, Sr. | ................. 2/438 |
| 5,155,863 A | * | 10/1992 | Roberts | ........................... 2/15 |
| 5,372,504 A | * | 12/1994 | Buechler | ...................... 434/35 |
| 5,614,963 A | * | 3/1997 | Parker | ......................... 351/47 |
| 5,660,549 A | * | 8/1997 | Witt, III | ...................... 434/226 |
| 5,671,483 A | * | 9/1997 | Reuber | .......................... 2/424 |
| 5,765,235 A | * | 6/1998 | Arnold | .......................... 2/424 |
| 6,062,222 A | | 5/2000 | Lewis et al. | |
| 6,347,401 B1 | | 2/2002 | Joyce | |
| 6,405,373 B1 | * | 6/2002 | Grau | ............................... 2/15 |

\* cited by examiner

*Primary Examiner*—Rodney M. Lindsey
(74) *Attorney, Agent, or Firm*—Gordon K. Anderson

(57) ABSTRACT

A translucent shield (20) is provided for covering a self contained breathing apparatus mask faceplate (22) to simulate smoke. The shield consists of a die cut shape of thermoplastic sheet that duplicates the outline of the self contained breathing apparatus mask faceplate. The translucent shield has a light penetration density concentration simulating smoke in various grades or densities replicating, at the least, limited visibility, intermediate visibility and total engulfment. In order to preclude light penetration, the shape of the shield includes a peripheral overlap (32) onto the mask. A method of removably attaching the shield to the self contained breathing apparatus face mask is provided by the use of pressure sensitive tape (36) or hooks and loop tape (38). The invention simulates smoke which visually limits light transmission to a person wearing an apparatus face mask during training exercise procedures for firefighters.

17 Claims, 4 Drawing Sheets

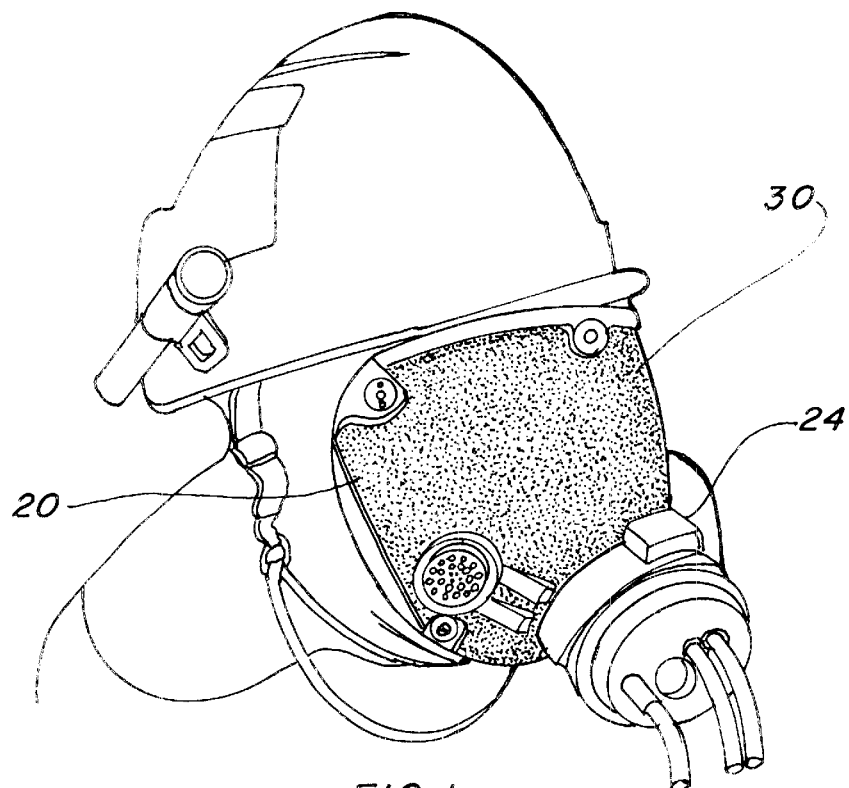
FIG. 1
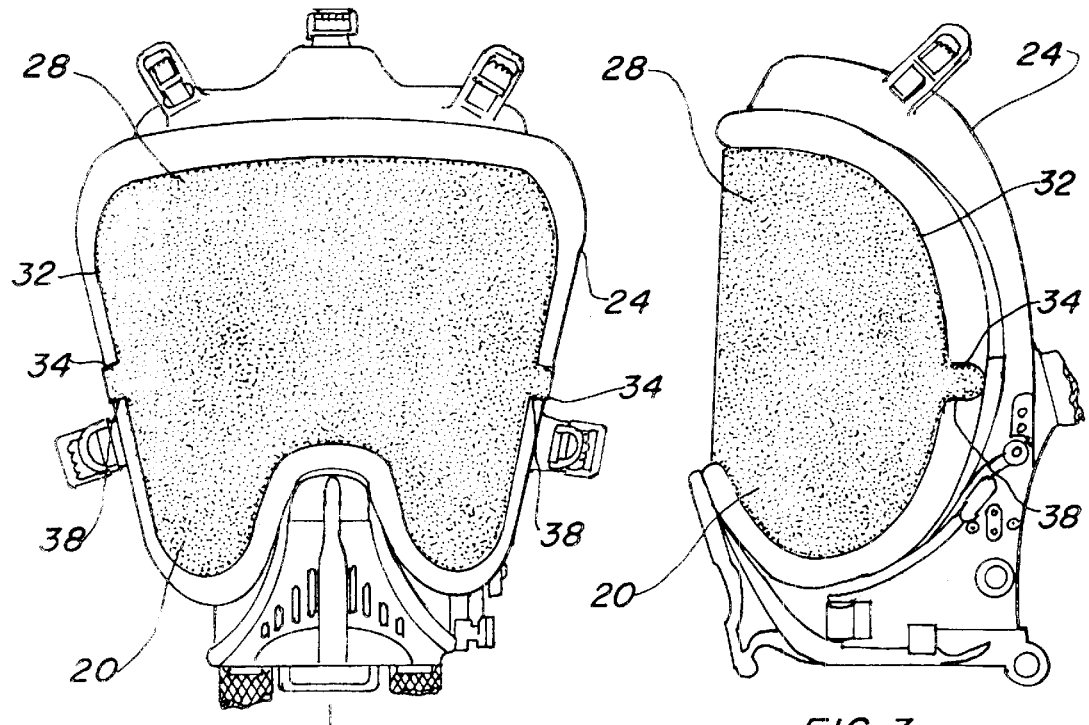
FIG. 2
FIG. 3

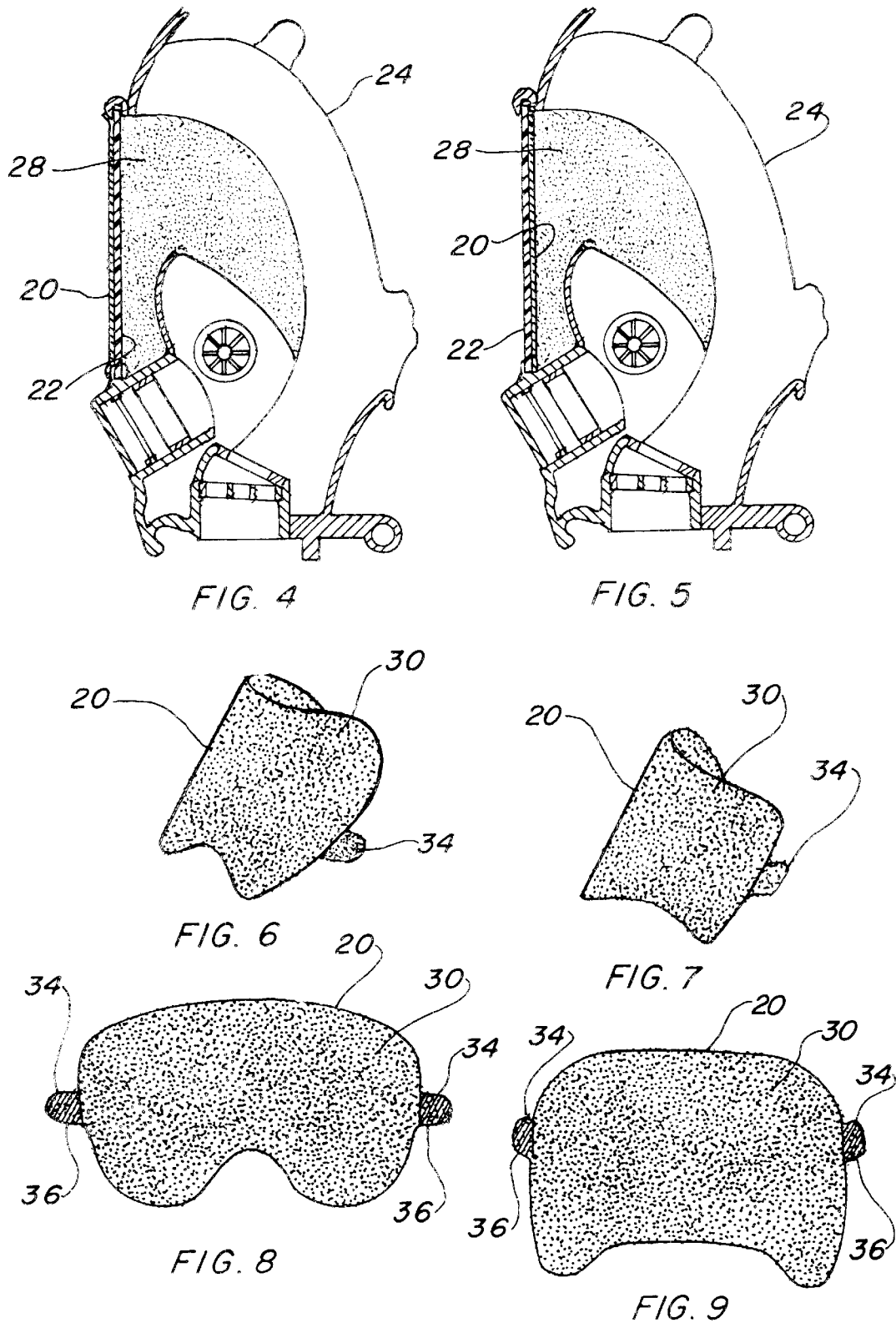

SMOKE SIMULATING SHIELD COVERING SCBA FACEPLATE

TECHNICAL FIELD

The present invention relates to light diminishing shields in general. More specifically to a shield removably attached over a self contained breathing apparatus face plate lens visually simulating smoke intensity for firefighting training.

BACKGROUND ART

In order to enter buildings and structures that are on fire and filled with smoke, firefighters typically utilize a self contained breathing apparatus along with protective clothing. Since high visibility is the goal of the apparatus manufacturer's considerable effort has been accomplished to make the mask face plate as large as possible and configured for maximum visual perception. As such, limiting vision has not been developed to any extent at the present time.

The prior art listed below did not disclose patents that possess any of the novelty of the instant invention; however the following U.S. patents are considered related relative to the self contained breathing apparatus mask:

| U.S. Pat. No. | Inventor | Issue Date |
| --- | --- | --- |
| 4,057,057 | Backlund | Nov. 8, 1977 |
| 4,069,516 | Watkins Jr. | Jan. 24, 1978 |
| 5,069,205 | Urso | Dec. 3, 1991 |
| 5,080,092 | Tenna | Jan. 14, 1992 |
| 6,062,222 | Lewis et al. | May 16, 2000 |
| 6,347,401 | Joyce | Feb. 19, 2002-- |

Backlund in U.S. Pat. No. 4,057,057 teaches a breathing mask having spectacles and a method of attaching them to either a half mask or an inner mask.

U.S. Pat. No. 4,069,516 issued to Watkins Jr. is for a resilient flexible sealing element conformable to the face of a wearer supported by a mask body. The sealing element extends completely around the open side of the mask body with a hinge web having a bead extending along the opposite sides and across the top of the mask for controlled buckling of the web in a manner mechanically loading the face engaging sealing element.

Urso in U.S. Pat. No. 5,069,205 teaches a quick donning head harness assembly for a respirator face mask using a rigid face piece and a flexible face seal. The head harness includes a cap with a lower strap casing and an upper strap casing. Rings connect to the upper corners of the face piece and an upper adjustable strap has right and left temple portions passing through the rings.

U.S. Pat. No. 5,080,092 issued to Tenna describes a protective mask that has a face shield covering the user's face formed of a rigid transparent material rimmed by a bellows seal. The seal provides the necessary tightness with comfort allowing continuous use of the mask even over an extended length of time.

Lewis et al in U.S. Pat. No. 6,062,222 disclose a face mask for a self contained breathing apparatus that has two pairs of straps fixed to the frame and a net head piece. The straps at the top of the head piece are fixed and the bottom straps are adjustable. A nose cup includes ribs that receive legs of a mounting member for eyeglasses. The mounting member moves relevant to the user's eyes.

Joyce in U.S. Pat. No. 6,347,401 teaches a thin protective sheet for covering a face plate on an air mask. This invention may comprise a substantially rectangular thin sheet of plastic having two circular cut outs and square cut outs with an edge having a semi-circular shape. Other embodiments may have a series of curves or oval shapes to fit around the mask protecting the mask from scratches, nicks, scrapes or any other damage from use.

DISCLOSURE OF THE INVENTION

Previously, self contained breathing apparatus, described hereafter as SCBA, have been used in conjunction with smoke filled rooms for training firefighters. Training using the actual SCBA in environments where smoke partially or almost totally engulfs the firefighter is extremely beneficial as it acquaints the trainee with the peripheral visual limitations of the SCBA mask and the murky surroundings of smoke. While this type of training is ideal, the cost to fill a room with smoke is expensive as a specialized structure and smoke generating equipment is required, further it takes time to ignite material in the generator and wait until sufficient smoke is created before the training can begin.

It is therefore a primary object of the invention to simulate the actual visual impairment of a selected density of smoke in a non-specialized convenient environment. This object is realized by the use of a shield that is translucent, limiting light penetration, and is configured to fit either on the outside or inside of the self contained breathing apparatus face plate lens. The shield slightly overlaps the face plate lens preventing any leakage of light and is held in place with pressure sensitive tape or the like. It may be clearly seen that this system of training may be used anytime and anywhere enhancing safety aspects of the trainees.

An important object of the invention is that the instructor may now clearly view the actions of the trainees and even video tape the session for de-briefing at a later time where the trainee may actually see how he or she reacted with limited vision. This approach permits trainers to direct each session much more effectively.

Another object of the invention eliminates the environmental hazards related to smoke making machines and from discharging the smoke into the atmosphere.

Still another object of the invention permits the instruction to be accomplished with a specifically selected smoke density as it has been found that three totally different shades of translucent material used in the construction of the shield duplicates a light smoke density for limited visibility, a medium smoke density for intermediate visibility and a dark smoke density for total smoke engulfment. With a smoke generating machine it is difficult to control the density and therefore training is subject to variable situations.

Yet another object of the invention is the cost savings realized by the training agency as the training budget may be used in other areas enhancing the overall training effort. Since this type of training may be required in other areas than professional firefighting, the invention is of great value since an inexpensive shield over the face plate lens of the SCBA mask may replicate and eliminate the need of a separate chamber filled with smoke.

A further object of the invention is its simplicity in use as the shield is held in place with pressure sensitive tape which is easy to install and intuitively obvious in its application and may be reused a number of times.

A final object of the invention is its adaptability to be used in different manufacturer's equipment. Each self SCBA maker makes a different style of mask; therefore the invention may be specifically configured to fit every style as only a different production tool is required to duplicate each shape. While there are a number of different manufacturers the most commonly used equipment by firefighting agencies are Scott, Survivair, MSA and ISI.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the smoke simulating shield in the preferred embodiment installed in conjunction with a Scott manufactured self contained breathing apparatus that is worn on firefighter.

FIG. 2 is a front elevation view of a MSA manufactured self contained breathing apparatus with the shield mounted on the outside of the faceplate.

FIG. 3 is a side view of the same self contained breathing apparatus as depicted in FIG. 2 with the shield mounted on the outside of the faceplate.

FIG. 4 is a cross sectional view taken along lines 4—4 of FIG. 2.

FIG. 5 is a cross sectional view taken along lines 5—5 of FIG. 2.

FIG. 6 is a partial isometric view the preferred embodiment shield as formed for use on the outside of a specific MSA self contained breathing apparatus mask.

FIG. 7 is a partial isometric view the preferred embodiment shield as formed for use on the inside of a specific MSA self contained breathing apparatus mask.

FIG. 8 is a view the preferred embodiment shield "in the flat" used on the outside of a specific MSA self contained breathing apparatus mask.

FIG. 9 is a view the preferred embodiment shield "in the flat" used on the inside of a specific MSA self contained breathing apparatus mask.

BEST MODE FOR CARRYING OUT THE INVENTION

Figure 10:
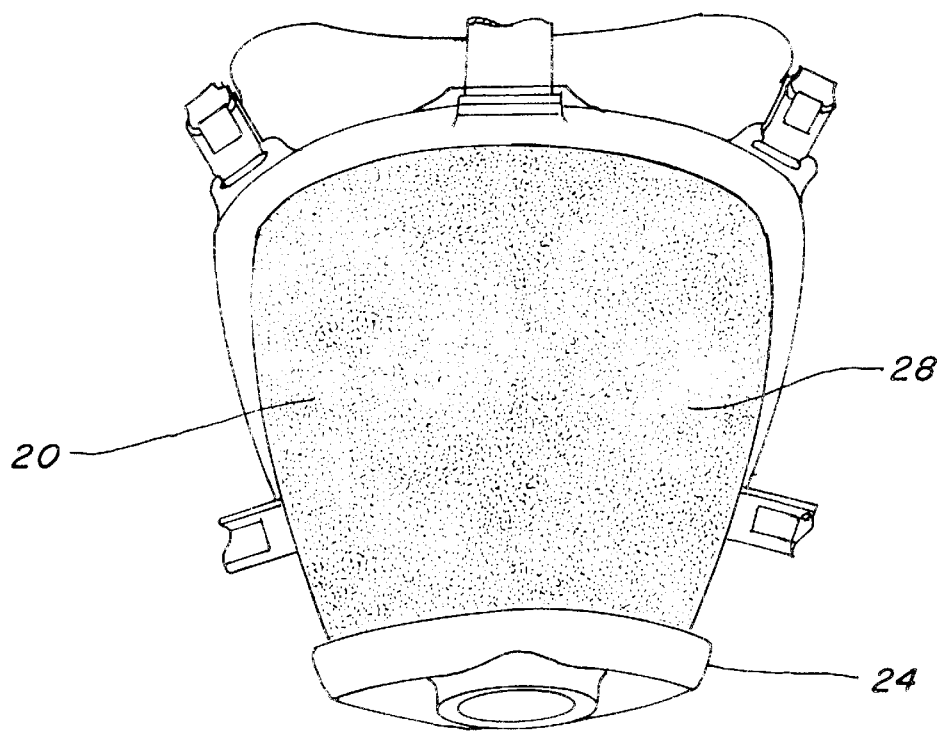
FIG. 10 is a front elevation view of a self contained breathing apparatus mask as manufactured by Survivair.

The best mode for carrying out the invention is presented in terms of a preferred embodiment. This preferred embodiment is shown in FIGS. 1 through 19 and is comprised of a shield 20 that covers a self contained breathing apparatus mask faceplate 22 for simulating smoke during training exercises for firefighters. The shield 20 is translucent and has a shape that duplicates the outline of the self contained breathing apparatus mask faceplate 22. As there are numerous original equipment manufacturers of the breathing apparatus 24, the drawings illustrate only three which represent some of the most common devices in domestic usage. FIGS. 1, 15–19 are made by Scott in the Scott-O-Vista Model, with FIGS. 2–9 depicting the MSA Ultra Elite Model and FIGS. 10–14 show the Survivair Model Twenty Twenty Plus. It will be realized that there are many more models available and normally each are offered in small, medium and large sizes, however, the inventive novelty is the same with only slight variations in configuration required.

In the preferred embodiment this translucent shield 20 is formed of rigid poly vinyl chloride (PVC) of a thickness of from 5 to 15 mils, however other types and sizes of thermoplastic would be acceptable substitutes such as polyethylene, cellulose acetate, polycarbonate, acrylic, acetyl or polyester etc. The most common method of manufacturer is to die cut the translucent shield 20 to a shape duplicating the outline of the self contained breathing apparatus mask faceplate 22

As stated previously, the translucent shield 20 has a light penetration density concentration simulating smoke. This light penetration density is achieved using a process consisting of silk screening, lithography, flexography, or rotography etc., coating the surface of the parent thermoplastic film material of the shield 20 with a predetermined mixture of white and clear ink.

In order to represent varying degrees of smoke concentration the translucent shield is graded as light density 26 for limited visibility, medium density 28 for intermediate visibility and dark density 30 for total smoke engulfment. It has been found through experts experience that the three densities are sufficient to represent the visibility blockage required during most training exercises. For representation purposes only, the drawings roughly depict the light density 26 in FIGS. 15–19, the medium density 28 in FIGS. 2–5, 10–14 and the dark density 30 in FIGS. 6–9. The preferred densities according to measurements taken on a reflection light densitometer indicate the optical density ratio is within the limit parameters of from 1.37 to 1.45 for the light density 26, from 1.49 to 1.55 for the medium density 28 and from 1.63 to 1.68 for the dark density 30, which is a ratio of the light transmission relative to a completely transparent surface.

It should not be overlooked that the base thermoplastic material may be produced with the color integrally formed during the manufacturing process by formulating a predetermined mixture of white ink and transparent resin. It is also possible for the face plate 22 of the self contained breathing apparatus mask 24 to be produced in like manner making the end product specifically limited for training purposes only, while still falling within the scope of the invention The shape of the translucent shield 20 includes sufficient overlap 32 onto the mask 24 to preclude light penetration. Some light leakage around the periphery is not detrimental as long as it is not possible to have direct vision through the crack as this would thwart the entire purpose of the invention. The training exercise would be useless if the trainee could still see even a glimpse of the outside environment. It has been found that the ideal overlap 32 onto the mask has a width dimension of from 0.05 inches (0.127 cm) to 0.25 inches (0.635 cm) according to the specific configuration of the faceplate 22.

Figures 11, 12:
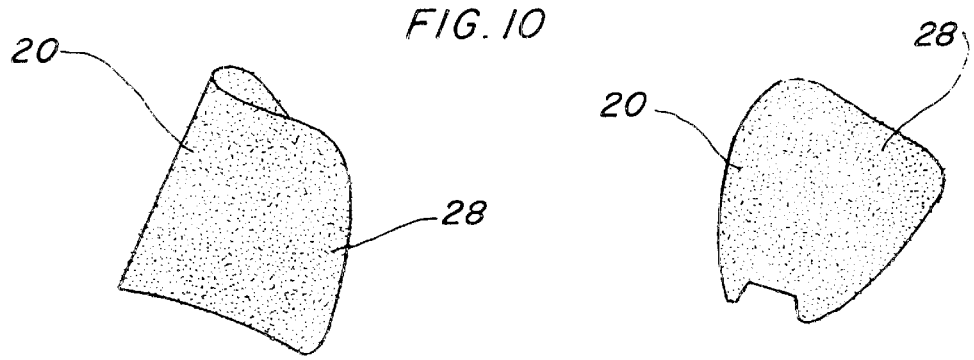
FIG. 11 is a partial isometric view the preferred embodiment shield as formed for use on the outside for a specific Survivair self contained breathing apparatus mask.
FIG. 12 is a partial isometric view the preferred embodiment shield as formed for use on the inside of a specific Survivair self contained breathing apparatus mask.
Figures 13, 14:
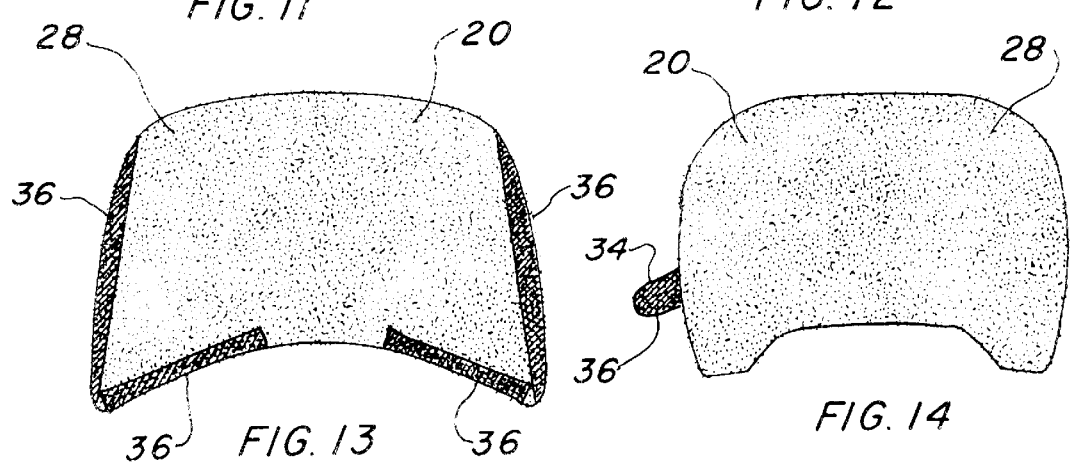
FIG. 13 is a view the preferred embodiment shield "in the flat" used on the outside of a specific Survivair self contained breathing apparatus mask.
FIG. 14 is a view the preferred embodiment shield "in the flat" used on the inside of a specific Survivair self contained breathing apparatus mask.
Figure 15:
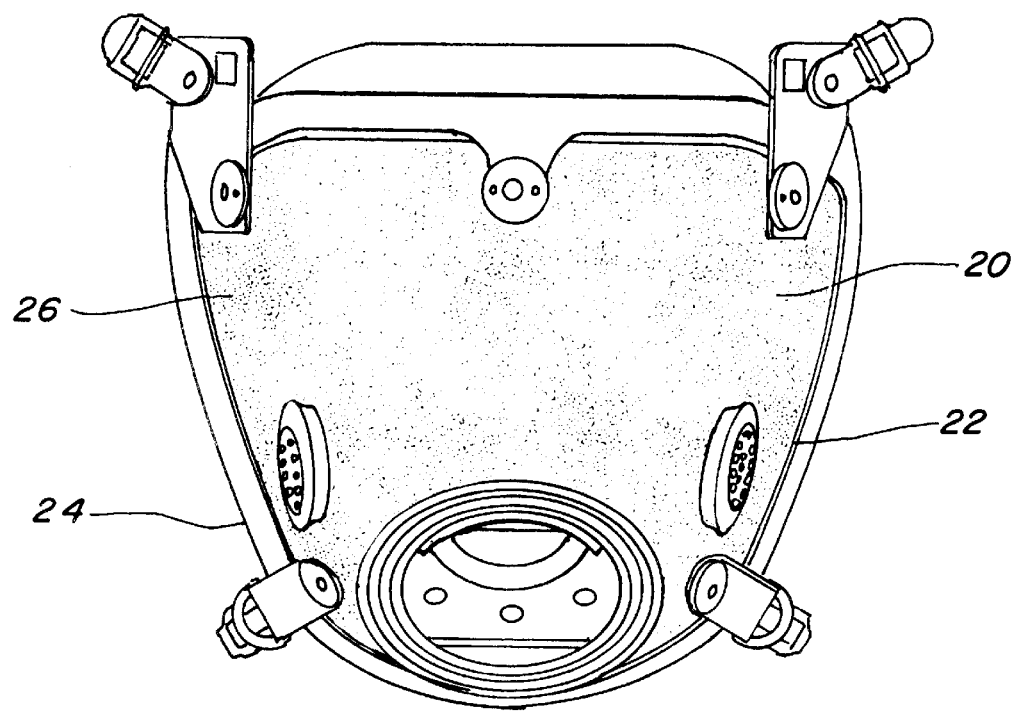
FIG. 15 is a front elevation view of a self contained breathing apparatus mask as manufactured by Scott.
Figures 16, 17:
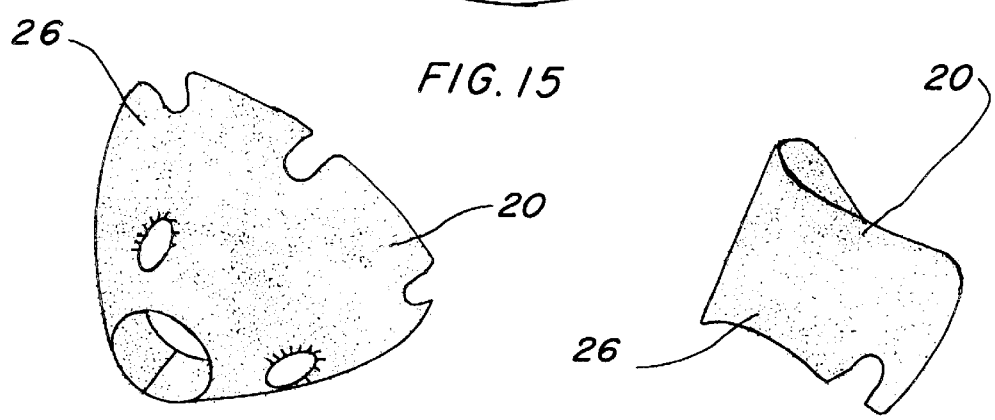
FIG. 16 is a partial isometric view the preferred embodiment shield as formed for use on the outside of a specific Scott self contained breathing apparatus mask.
FIG. 17 is a partial isometric view the preferred embodiment shield as formed for use on the inside of a specific Scott self contained breathing apparatus mask.
Figures 18, 19:
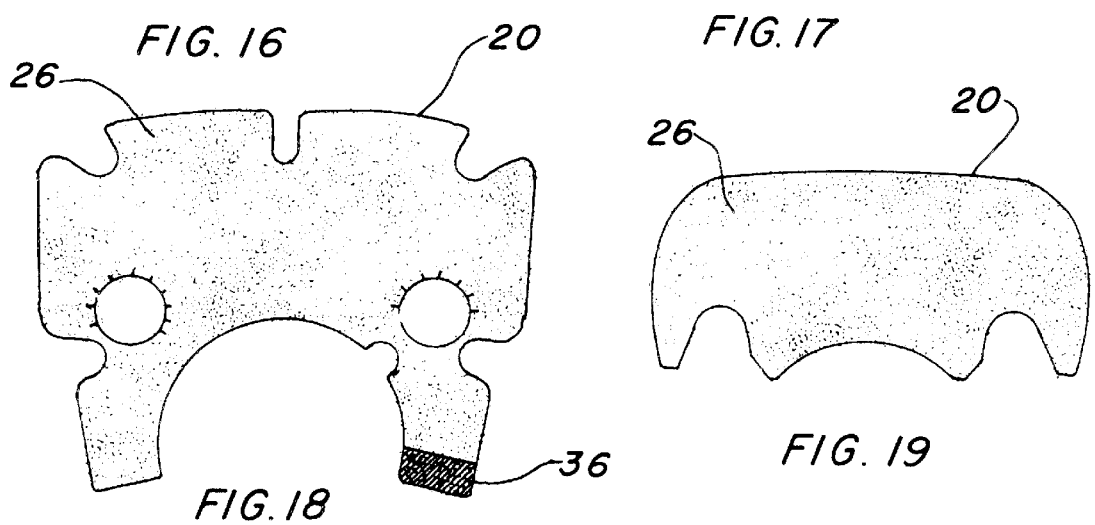
FIG. 18 is a view the preferred embodiment shield "in the flat" used on the outside of a specific Scott self contained breathing apparatus mask.
FIG. 19 is a view the preferred embodiment shield "in the flat" used on the inside of a specific Scott self contained breathing apparatus mask.

Means are provided for removably attaching the shield 20 to the self contained breathing apparatus face mask 24, permitting the shield 20 to be held securely in place and yet be removed when the training exercise is completed. The preferred attachment means is to add one or more integral tabs 34 to an outside edge of the shield 20 and affix two sided pressure sensitive tape 36 on the tabs 34 as illustrated in FIGS. 6–9 and 13. It is possible to eliminate the need for tabs 34 and tape on the configurations that fit inside of the faceplate 22 as they many times fit the inside surface precisely, such as those shown in FIGS. 12, 14, 17 and 19. Further in some embodiments of the specific shape such as illustrated for the Scott-O-Vista Model require the pressure sensitive tape 36 to be on one portion and overlap the ends, as illustrated in FIG. 16. Other designs and configurations may require a strip of pressure sensitive tape 36 along one or more of the sides according to the specific equirements as shown in FIGS. 11 and 13. It is to be noted that hook and loop tap 38, represented in FIG. 10, may be substituted for the pressure sensitive tape 36 with equal ease as the loop portion may be retained on the mask 24 and the hook side may remain attached to the tab 34, or visa versa, for ease of replacement.

The translucent shield 20 may be positioned either on the outside or inside of the self contained breathing apparatus mask faceplate 22. This optional location is usually decided by the user as to his or her preference relative to the type of training, importance of time to install the shield 20 and the facility available. FIGS. 1, 7, 9, 12, 14, 15, 17 and 19 depict the inside installation method of the shield 20, some having tabs 34 and others without the necessity of their use. FIGS. 2–6, 8, 10, 11, 13, 16 and 18 illustrate the outside mounting location of the shield 20 with tabs 34, a strip of pressure sensitive tape 36 along each vertical edge, or overlapping one end.

The installation of the shield 20 to the self contained breathing apparatus mask is easy to accomplish and understand. Once the shield's location is determined, the user simply removes the non-sticking protective strip from the pressure sensitive tape 36 or hook and loop tape 38 and attaches the shield to the outside of the mask. On the inside installation method the shield 20 is bent in a curl and inserted into the inside cavity of the mask then straitened out to fit the inside shape with some final adjustment made to cover the entire optical surface of the faceplate 22. It is possible to reuse the shield 20 a number of times until the tape 36 looses its adhering qualities or becomes so wrinkled from handling and bending that replacement becomes necessary.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A shield for covering a self contained breathing apparatus mask faceplate to simulate smoke comprising, a translucent shield formed of rigid poly vinyl chloride (PVC) removably attached and overlapping a self contained breathing apparatus face plate lens visually simulating smoke intensity for firefighting training.

2. A shield for covering a self contained breathing apparatus mask faceplate to simulate smoke comprising, a translucent shield formed of rigid poly vinyl chloride (PVC) having a shape duplicating the outline of said self contained breathing apparatus mask faceplate, wherein said translucent shield has a light penetration density concentration simulating smoke, wherein said translucent shield shape includes sufficient overlap the faceplate onto the mask to preclude light penetration, and means for removably attaching the shield to a self contained breathing apparatus mask holding said faceplate visually limiting light transmission to a person wearing the apparatus face mask simulating smoke during training exercise procedures for firefighters.

3. The shield for covering a self contained breathing apparatus mask faceplate as recited in claim 2 wherein said translucent shield has a thickness of from 5 to 15 mils.

4. The shield for covering a self contained breathing apparatus mask faceplate as recited in claim 2 wherein said translucent shield is integrally formed with the faceplate.

5. The shield for covering a self contained breathing apparatus mask faceplate as recited in claim 2 wherein said translucent shield further comprises a die cut shape duplicating the outline of said self contained breathing apparatus mask faceplate.

6. The shield for covering a self contained breathing apparatus mask faceplate as recited in claim 2 wherein said translucent shield light penetration density is further comprises a shield selected from the group consisting of a silk screened shield, a lithographic shield, a flexography shield, and a rotography shield, with a predetermined mixture of white and clear ink.

7. The shield for covering a self contained breathing apparatus mask faceplate as recited in claim 2 wherein said translucent shield light penetration density is formulated from a predetermined mixture of white ink and transparent resin.

8. The shield for covering a self contained breathing apparatus mask faceplate as recited in claim 2 wherein said translucent shield light penetration density is graded as light density for limited visibility.

9. The shield for covering a self contained breathing apparatus mask faceplate as recited in claim 2 wherein said translucent shield light penetration density is graded as medium density for intermediate visibility.

10. The shield for covering a self contained breathing apparatus mask faceplate as recited in claim 2 wherein said translucent shield light penetration density is graded as dark density for total smoke engulfment.

11. The shield for covering a self contained breathing apparatus mask faceplate as recited in claim 2 wherein said translucent shield shape overlap onto the mask is from 0.05 inches (0.127 cm) to 0.25 inches (0.635 cm).

12. The shield for covering a self contained breathing apparatus mask faceplate as recited in claim 2 wherein said means for removably attaching the shield to a self contained breathing apparatus face mask comprises self adhering tape for attachment of the shield.

13. The shield for covering a self contained breathing apparatus mask faceplate as recited in claim 2 wherein said means for removably attaching the shield to a self contained breathing apparatus face mask comprises at least one tab covered with pressure sensitive tape for attachment to the mask adjacent to the faceplate.

14. The shield for covering a self contained breathing apparatus mask faceplate as recited in claim 2 wherein said means for removably attaching the shield to a self contained breathing apparatus face mask comprises at least one tab covered with hook and loop tape for attachment to the mask adjacent to the faceplate.

15. The shield for covering a self contained breathing apparatus mask faceplate as recited in claim 2 wherein said translucent shield is positioned outside the self contained breathing apparatus mask faceplate.

16. The shield for covering a self contained breathing apparatus mask faceplate as recited in claim 2 wherein said translucent shield is positioned inside the self contained breathing apparatus mask faceplate.

17. A shield for covering a self contained breathing apparatus mask faceplate to simulate smoke comprising, a translucent shield formed of rigid poly vinyl chloride (PVC) having a shape duplicating the outline of said self contained breathing apparatus mask faceplate with a light sealing overlap, said translucent shield having a light penetration density concentration simulating smoke, and means for removably attaching the shield to a self contained breathing apparatus face mask, visually limiting light transmission to a person wearing the apparatus face mask, simulating smoke during training exercise for firefighters.

* * * * *